United States Patent
Lippman (10) Patent No.: US 11,582,906 B2
(45) Date of Patent: Feb. 21, 2023

(54) SPEED-ADJUSTABLE SELF-PROPELLED FOUR-WHEEL-DRIVE WALK-BEHIND LAWN MOWER

(71) Applicant: Duro Industries, LLC, Dover, DE (US)

(72) Inventor: Mirjana Lippman, Park Ridge, IL (US)

(73) Assignee: Duro Industries, LLC, Dover, DE (US)

( * ) Notice: Subject to any disclaimer, the term of this patent is extended or adjusted under 35 U.S.C. 154(b) by 580 days.

(21) Appl. No.: 16/798,905

(22) Filed: Feb. 24, 2020

(65) Prior Publication Data

US 2021/0259152 A1 Aug. 26, 2021

(51) Int. Cl.
| | | |
|---|---|---|
| *A01D 34/68* | (2006.01) | |
| *A01D 34/69* | (2006.01) | |
| *A01D 34/82* | (2006.01) | |
| *A01D 34/00* | (2006.01) | |
| A01D 101/00 | (2006.01) | |

(52) U.S. Cl.
CPC ....... *A01D 34/6806* (2013.01); *A01D 34/006* (2013.01); *A01D 34/69* (2013.01); *A01D 34/824* (2013.01); *A01D 2034/6837* (2013.01); *A01D 2034/6843* (2013.01); *A01D 2101/00* (2013.01)

(58) Field of Classification Search
CPC .. A01D 34/6806; A01D 34/006; A01D 34/69; A01D 34/824; A01D 2034/6837; A01D 2034/6843
See application file for complete search history.

(56) References Cited

U.S. PATENT DOCUMENTS

| | | | | |
|---|---|---|---|---|
| 4,321,991 A | * | 3/1982 | Teijido | A01D 69/06 474/70 |
| 5,377,774 A | * | 1/1995 | Lohr | F16H 9/12 180/19.1 |
| 6,196,367 B1 | * | 3/2001 | Hanabusa | F16H 9/14 474/19 |
| 9,055,713 B2 | * | 6/2015 | Helgesen | A01D 34/69 |
| 9,677,648 B2 | * | 6/2017 | Wadzinski | A01D 34/69 |
| 10,485,167 B2 | * | 11/2019 | Smith | A01D 34/6806 |
| 2009/0191992 A1 | * | 7/2009 | Osborne | A01D 34/6806 74/473.15 |
| 2015/0113932 A1 | * | 4/2015 | Helgesen | A01D 34/68 56/11.8 |

* cited by examiner

*Primary Examiner* — Abigail A Risic
(74) *Attorney, Agent, or Firm* — Georgiy L. Khayet (57) ABSTRACT

A speed-adjustable self-propelled four-wheel-drive walk-behind lawn mower is provided. The lawn mower may include a cutting deck, an engine installed on the cutting deck including an engine shaft, and a cutting blade installed inside the cutting deck. The lawn mower further includes a first transmission box and a second transmission box. The lawn mower includes an engine pulley installed on the engine shaft, a first combined pulley in communication with the first transmission box, and a second combined pulley in communication with the second transmission box. The lawn mower includes a belt connecting the first combined pulley, the second combined pulley, and the engine pulley. The belt is configured to transmit, via the engine pulley, a driving force from the engine to the first combined pulley and the second combined pulley to rotate the first transmission box and the second transmission box.

18 Claims, 7 Drawing Sheets

┌─────────────────────────────────────────────────────────────────┐
│   PROVIDE A CUTTING DECK, THE CUTTING DECK COMPRISING A CUTTING │
│                         CHAMBER 705                              │
└─────────────────────────────────────────────────────────────────┘
                                  │
┌─────────────────────────────────────────────────────────────────┐
│  INSTALL AN ENGINE ON THE CUTTING DECK, THE ENGINE HAVING AN     │
│                       ENGINE SHAFT 710                           │
└─────────────────────────────────────────────────────────────────┘
                                  │
┌─────────────────────────────────────────────────────────────────┐
│          INSTALL AN ENGINE PULLEY ON THE ENGINE SHAFT            │
│                              715                                 │
└─────────────────────────────────────────────────────────────────┘
                                  │
┌─────────────────────────────────────────────────────────────────┐
│   INSTALL A CUTTING BLADE INSIDE THE CUTTING DECK ON THE ENGINE  │
│                            SHAFT 720                             │
└─────────────────────────────────────────────────────────────────┘
                                  │
┌─────────────────────────────────────────────────────────────────┐
│   PROVIDE A FIRST TRANSMISSION BOX LOCATED AT A FRONT PORTION OF │
│                        THE CUTTING DECK 725                      │
└─────────────────────────────────────────────────────────────────┘
                                  │
┌─────────────────────────────────────────────────────────────────┐
│  PROVIDE A SECOND TRANSMISSION BOX LOCATED AT A REAR PORTION OF  │
│                       THE CUTTING DECK 730                       │
└─────────────────────────────────────────────────────────────────┘
                                  │
┌─────────────────────────────────────────────────────────────────┐
│  PROVIDE A FIRST COMBINED PULLEY IN COMMUNICATION WITH THE FIRST │
│  TRANSMISSION BOX AND LOCATED AT THE FRONT PORTION OF THE CUTTING│
│                            DECK 735                              │
└─────────────────────────────────────────────────────────────────┘
                                  │
┌─────────────────────────────────────────────────────────────────┐
│   PROVIDE A SECOND COMBINED PULLEY IN COMMUNICATION WITH THE     │
│  SECOND TRANSMISSION BOX AND LOCATED AT THE REAR PORTION OF THE  │
│                        CUTTING DECK 740                          │
└─────────────────────────────────────────────────────────────────┘
                                  │
┌─────────────────────────────────────────────────────────────────┐
│ PROVIDE A BELT CONNECTING THE FIRST COMBINED PULLEY, THE SECOND  │
│ COMBINED PULLEY, AND THE ENGINE PULLEY AND TRANSMIT, VIA THE     │
│ ENGINE PULLEY, A DRIVING FORCE FROM THE ENGINE TO THE FIRST      │
│ COMBINED PULLEY AND THE SECOND COMBINED PULLEY TO ROTATE THE     │
│ FIRST TRANSMISSION BOX AND THE SECOND TRANSMISSION BOX           │
│                              745                                 │
└─────────────────────────────────────────────────────────────────┘
```

FIG. 7

SPEED-ADJUSTABLE SELF-PROPELLED FOUR-WHEEL-DRIVE WALK-BEHIND LAWN MOWER

TECHNICAL FIELD

The present technology relates to lawn mowers and, more specifically, to speed-adjustable self-propelled four-wheel-drive walk-behind lawn mowers.

BACKGROUND

Lawn mowers are widely used nowadays and manufactures tend to create new types of lawn mowers or change the structure of existing lawn mowers to make them fit customer needs. Various techniques can be applied in conventional lawn mowers to adjust a walking speed. For example, the walking speed can be adjusted by using tension of belts that transmit driving force from the engine to the transmission box. Specifically, the speed adjustment can be achieved by adjusting the belt tension so that a lower belt tension is used to cause higher belt slippage and, hence, result in a lower walking speed. A higher belt tension can be used to cause lower belt slippage and, hence, result in a higher walking speed.

However, this type of speed adjustment is not accurate due to the adjustable speed range being very limited and the walking speed not being stable. In particular, under the same belt tension, the ground friction can change as the lawn mower moves through different surface areas. This can result in the walking speed changing because the belt slippage is defined by the ground friction and not by the belt tension. In addition, adjusting the speed of a front transmission box or a rear transmission separately with two separate belts cannot ensure the same tension of both belts, which may result in different speeds on front wheels and rear wheels so that the lawn mower cannot move smoothly. As the adjustable range of the belt tension is small, the resulting speed range is rather small as well.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one embodiment of the disclosure, a lawn mower is provided. The lawn mower may include a cutting deck and an engine installed on the cutting deck. The cutting deck may include a cutting chamber. The engine may include an engine shaft. The lawn mower may further include a cutting blade installed in the cutting chamber on the engine shaft. The lawn mower may further include a first transmission box located at a front portion of the cutting deck and a second transmission box located at a rear portion of the cutting deck. The lawn mower may further include an engine pulley installed on the engine shaft, a first combined pulley in communication with the first transmission box and located at the front portion of the cutting deck, and a second combined pulley in communication with the second transmission box and located at the rear portion of the cutting deck. The lawn mower may further include a belt connecting the first combined pulley, the second combined pulley, and the engine pulley. The belt may be configured to transmit, via the engine pulley, a driving force from the engine to the first combined pulley and the second combined pulley to rotate the first transmission box and the second transmission box.

According to one example embodiment of the disclosure, a method for manufacturing a lawn mower is provided. The method may commence with providing a cutting deck. The cutting deck may include a cutting chamber. The method may continue with installing an engine on the cutting deck. The engine may have an engine shaft. The method may continue with installing an engine pulley on the engine shaft. The method may further include installing a cutting blade in the cutting chamber on the engine shaft. The method may further include providing a first transmission box located at a front portion of the cutting deck and providing a second transmission box located at a rear portion of the cutting deck. The method may further include providing a first combined pulley in communication with the first transmission box and located at the front portion of the cutting deck and providing a second combined pulley in communication with the second transmission box and located at the rear portion of the cutting deck. The method may continue with providing a belt connecting the first combined pulley, the second combined pulley, and the engine pulley. The belt may transmit, via the engine pulley, a driving force from the engine to the first combined pulley and the second combined pulley to rotate the first transmission box and the second transmission box.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present disclosure is directed to various embodiments of speed-adjustable self-propelled four-wheel-drive walk-behind lawn mowers and methods for manufacturing the lawn mowers. The lawn mower may include a cutting deck having a cutting chamber with a downward opening, an operation handle connected to the cutting deck and extending obliquely rear upward, and an engine installed on the cutting deck and having an engine shaft. The lawn mower may further include a cutting blade installed in the cutting chamber of the cutting deck and rotating around the engine shaft to cut the grass and an engine pulley installed on the engine shaft. The lawn mower may further include two transmission boxes to drive the lawn mower and four wheels. A first transmission box may be located at the front portion of the cutting deck and a second transmission box may be located at the rear portion of the cutting deck. The lawn mower may further include two combined pulleys, each connected to one of the transmission boxes. Each of the combined pulleys may include one fixed pulley, one movable pulley, and a pulley shaft on which the fixed pulley and the movable pulley are installed. The movable pulley can move axially along the pulley shaft. A spring may be attached to each of the movable pulleys. The spring can press the movable pulley towards the fixed pulley.

The lawn mower may further include a belt that connects each of the combined pulleys on the transmission boxes and the engine pulley on the engine shaft together to provide a belt transmission. The belt may transmit, via the engine pulley, a driving force from the engine to the first combined pulley and the second combined pulley to rotate the first transmission box and the second transmission box.

A fixed belt tension may be applied to the lawn mower. The diameter of the contacting area between each of the combined pulleys and the belt may be changed to provide different diameter ratios and adjust the speed transmitted to wheels of the lawn mower. Therefore, no belt slippage is needed to provide a stable speed for the lawn mower. Additionally, a wider adjustable speed range and accurate adjustment of speed can be provided by using the combined pulleys.

Figure 1:
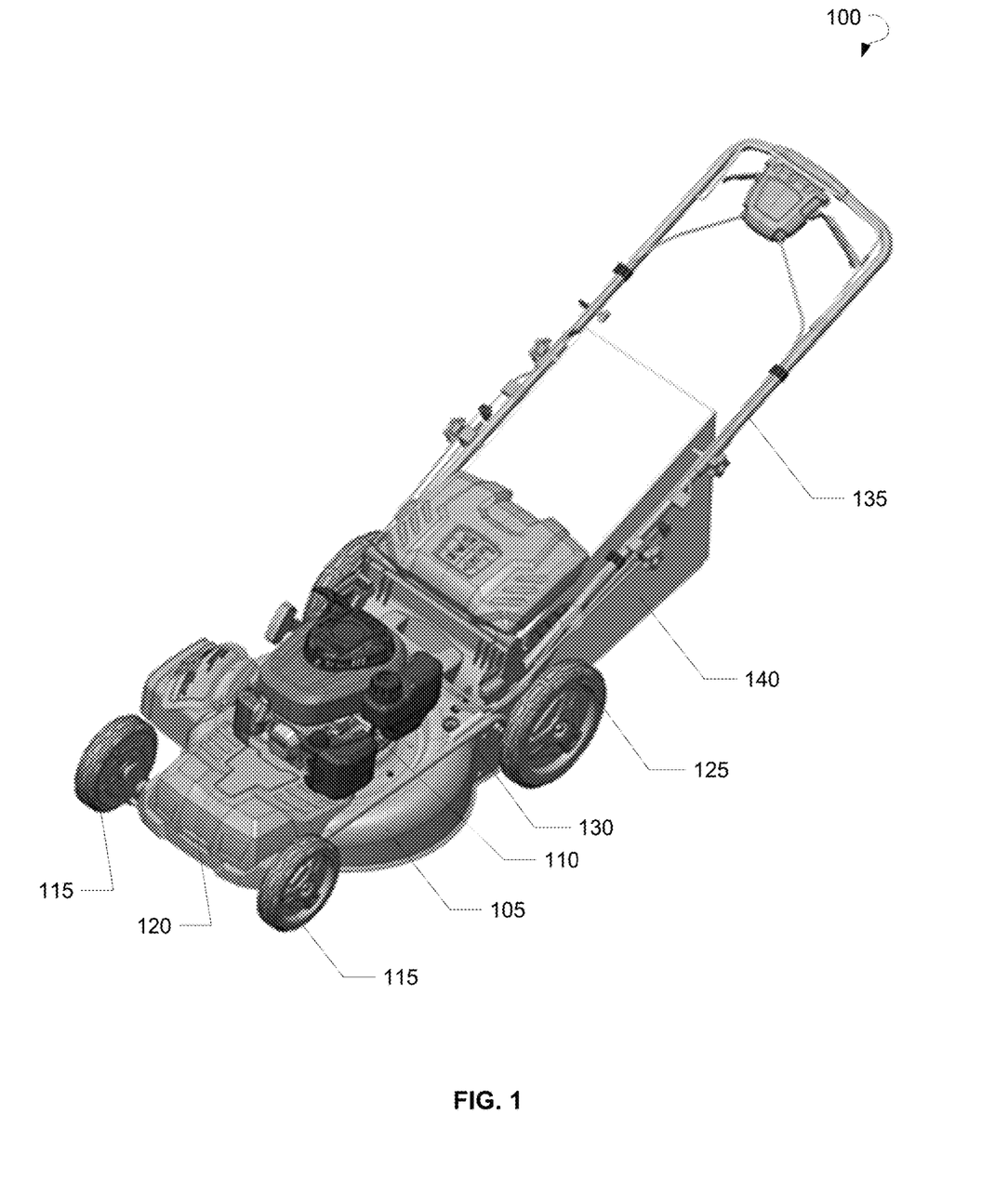
FIG. 1 is a general perspective view of a lawn mower, according to an example embodiment.

Referring now to the drawings, FIG. 1 is a general perspective view of a lawn mower 100, according to an example embodiment. The lawn mower 100 may have a cutting deck 105 having a cutting chamber (as shown in detail below with reference to FIG. 2). The lawn mower 100 may further have an engine 110 installed on the cutting deck 105. The lawn mower 100 may further have four wheels, where the first two wheels 115 are located in a front portion 120 of the cutting deck 105 and the second two wheels 125 are located in a rear portion 130 of the cutting deck 105. The lawn mower 100 may further have an operation handle 135 connected to the cutting deck 105 and extending from the cutting deck 105 obliquely upwards. The lawn mower 100 may include a grass collector 140 for receiving and retaining grass clippings.

Figure 2:
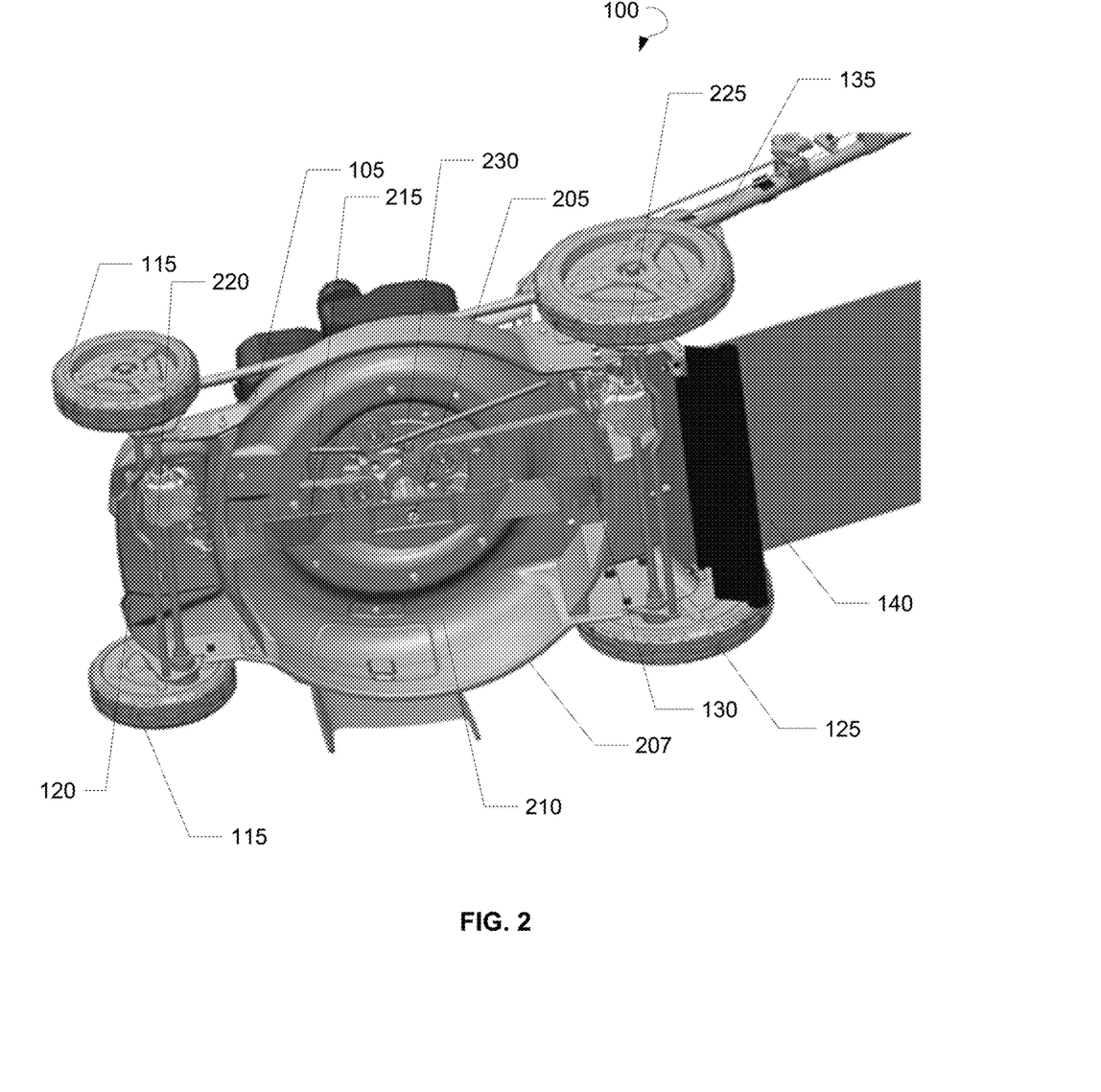
FIG. 2 is a bottom perspective view of a lawn mower, according to an example embodiment.

FIG. 2 is another perspective view of a lawn mower 100, according to an example embodiment. The engine may have an engine shaft 205. The cutting deck 105 of the lawn mower 100 may have a cutting chamber 210. The cutting deck 105 has a downward opening 207. A cutting blade 215 may be installed in the downward opening 207 of the cutting chamber 210. The cutting blade 215 may be mounted on the engine shaft 205. The driving force transmitted from the engine to the cutting blade 215 may rotate the cutting blade 215 in the downward opening 207 to make the cutting blade 215 to cut grass.

The lawn mower 100 may further have two transmission boxes: a first transmission box 220 located in the front portion 120 of the cutting deck 105 and a second transmission box 225 located in the rear portion 130 of the cutting deck 105. The first transmission box 220 may be in communication with the first two wheels 115 and the second transmission box 225 may be in communication with the second two wheels 125. The lawn mower 100 may further have an engine pulley 230 installed on the engine shaft 205.

Figure 3:
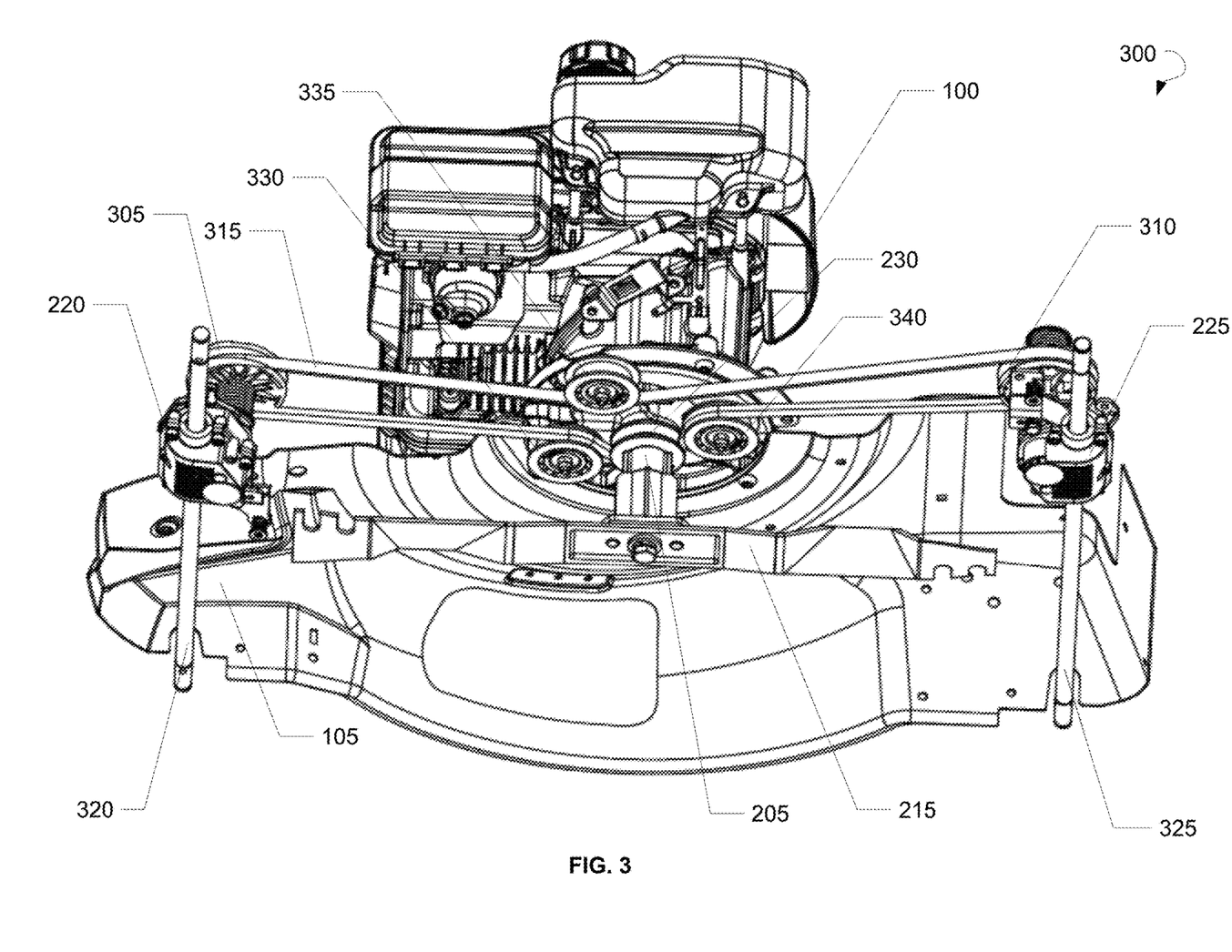
FIG. 3 is a sectional perspective view of a lawn mower showing a mechanism for transmission of driving force from an engine to transmission boxes, according to an example embodiment.

FIG. 3 is a sectional perspective view 300 of a lawn mower showing a mechanism for transmission of a driving force from an engine to transmission boxes, according to an example embodiment. The lawn mower 100 may include a first combined pulley 305 in communication with the first transmission box 220 and located at the front portion of the cutting deck 105. The lawn mower 100 may further include a second combined pulley 310 in communication with the second transmission box 225 and located at the rear portion of the cutting deck 105. The lawn mower 100 further has a belt 315 connecting the first combined pulley 305, the second combined pulley 310, and the engine pulley 230. The belt 315 may be configured to transmit, via the engine pulley 230, a driving force from the engine to the first combined pulley 305 and the second combined pulley 310 to rotate the first transmission box 220 and the second transmission box 225. The rotation of the first transmission box 220 rotates a first driving shaft 320 of the first transmission box 220, which in turn drives the first two wheels 115 shown in FIG. 2. The rotation of the second transmission box 225 rotates a second driving shaft 325 of the second transmission box 225, which in turn drives the second two wheels 125 shown in FIG. 2.

In an example embodiment, the lawn mower 100 may further have one or more idler pulleys shown as idler pulleys 330, 335, and 340. The idler pulleys 330, 335, and 340 may be installed in proximity to the engine pulley 230 and provide tension between the belt 315 and the engine pulley 230. The idler pulleys 330, 335, and 340 may also align the belt 315 as the belt engages the engine pulley 230. Although three idler pulleys 330, 335, and 340 are shown in FIG. 3, any other number of idler pulleys may be utilized in example embodiments. The distance between each of the idler pulleys 330, 335, and 340 and the engine pulley 230 and the location of each of the idler pulleys 330, 335, and 340 with respect to the engine pulley 230 may be selected in each specific embodiment depending on a particular structure of the lawn mower.

Figure 4A:
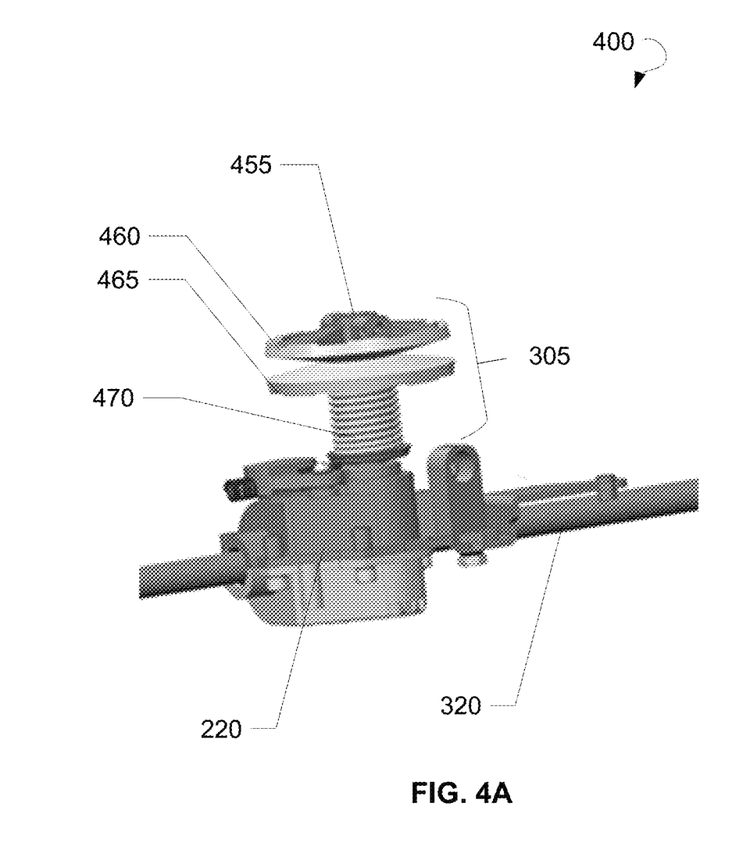
FIG. 4A is a perspective view of a combination of a first transmission box and a first combined pulley, according to an example embodiment.

FIG. 4A is a perspective view 400 of a combination of a first transmission box 220 and a first combined pulley 305, according to an example embodiment. The first combined pulley 305 includes a first pulley shaft 455 in communication with the first transmission box 220. The first combined pulley 305 further includes a first fixed pulley 460 and a first movable pulley 465. The first fixed pulley 460 is fixedly disposed on the first pulley shaft 455. The first movable pulley 465 is movable axially along the first pulley shaft 455. The first combined pulley 305 further includes a first spring 470 disposed on the first pulley shaft 455 and contacting the first movable pulley 465 and pressing the first movable pulley 465 to the first fixed pulley 460.

Figure 4B:
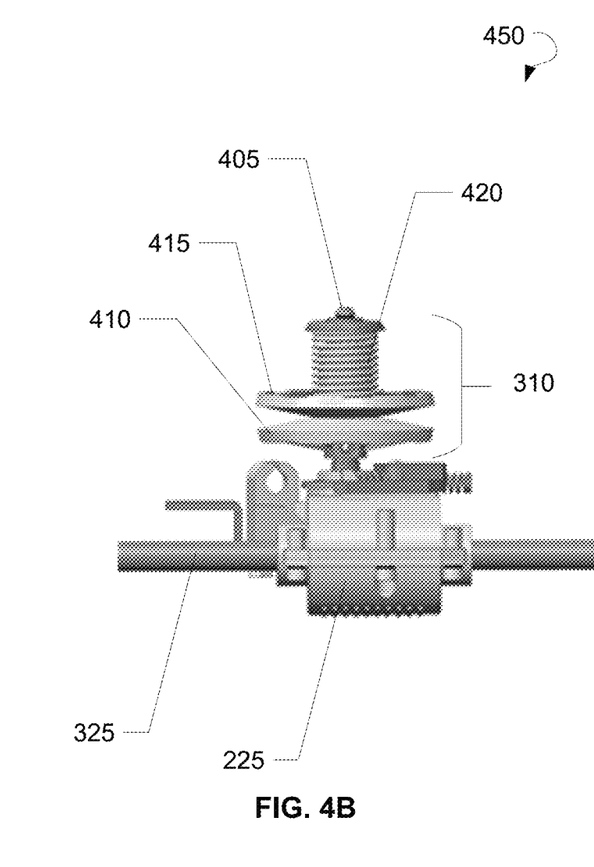
FIG. 4B is a front view of a combination of a second transmission box and a second combined pulley, according to an example embodiment.

FIG. 4B is a front view 450 of a combination of a second transmission box 225 and a second combined pulley 310, according to an example embodiment. The second combined pulley 310 includes a second pulley shaft 405 in communication with the second transmission box 225. The second combined pulley 310 further includes a second fixed pulley 410 and a second movable pulley 415. The second fixed pulley 410 is fixedly disposed on the second pulley shaft 405. The second movable pulley 415 is movable axially along the second pulley shaft 405. The second combined pulley 310 further includes a second spring 420 disposed on the second pulley shaft 405 and contacting the second movable pulley 415 and pressing the second movable pulley 415 to the second fixed pulley 410.

Figure 5:
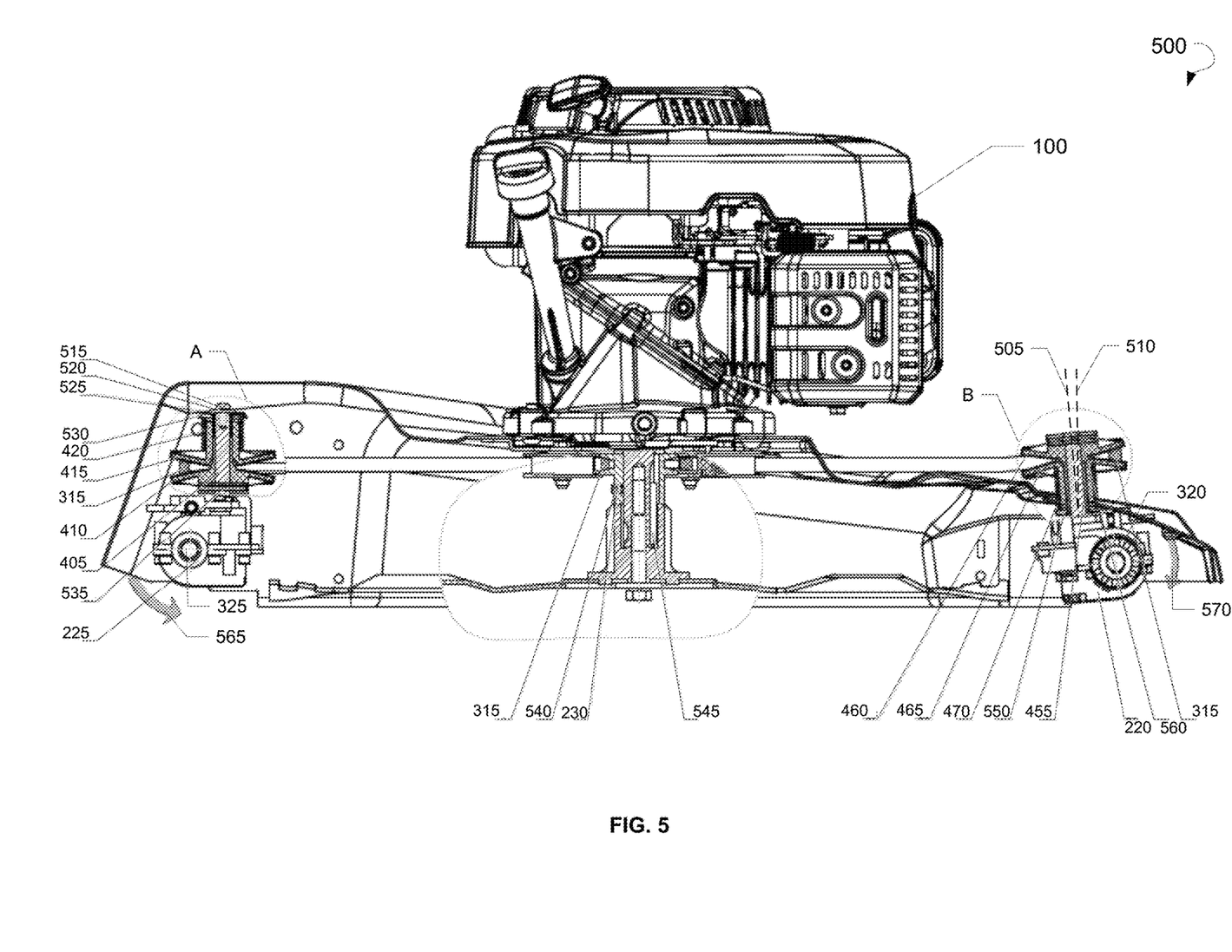
FIG. 5 is a sectional view of a lawn mower showing a first combined pulley and a second combined pulley in communication with an engine pulley and transmission boxes, according to an example embodiment.

The first combined pulley 305 shown in FIG. 4A and the second combined pulley 310 shown in FIG. 4B are disposed upside-down with respect to each other in the lawn mower, as shown in detail in FIG. 5. More specifically, in the first combined pulley 305, the first fixed pulley 460 is an upper pulley and the first movable pulley 465 is a lower pulley. In the second combined pulley 310, the second fixed pulley 410 is a lower pulley and the second movable pulley 415 is an upper pulley.

In a further example embodiment, the first combined pulley 305 and the second combined pulley 310 can be disposed symmetrically with respect to each other, i.e. in the same direction with respect to each other. Specifically, in the first combined pulley 305, the first fixed pulley 460 can be an upper pulley and the first movable pulley 465 can be a lower pulley. In the second combined pulley 310, the second fixed pulley 410 can be an upper pulley and the second movable pulley 415 can be a lower pulley. Alternatively, the symmetrical position of the first combined pulley 305 and the second combined pulley 310 can be provided by positioning, in the first combined pulley 305, the first fixed pulley 460 as a lower pulley and the first movable pulley 465 as an upper pulley, and positioning, in the second combined pulley 310, the second fixed pulley 410 as a lower pulley and the second movable pulley 415 as an upper pulley.

The driving force is provided from the engine to the engine shaft 205, which also acts as a blade rotating shaft and on which the engine pulley 230 is located. Then, the driving force is transferred by the engine pulley 230, via the belt 315, to the second movable pulley 415 and the second fixed pulley 410 on the second driving shaft 325 of the second transmission box 225 and to the first movable pulley 465 and the first fixed pulley 460 on the first driving shaft 320 of the first transmission box 220 at the same time.

The second combined pulley 310 (the combination of the second movable pulley 415 and the second fixed pulley 410) drives a worm and a worm gear mechanism inside the second transmission box 225 to rotate the second driving shaft 325 of the second transmission box 225. The second two wheels turn with the rotation of the second driving shaft 325.

The first combined pulley 305 (the combination of the first movable pulley 465 and the first fixed pulley 460) drives a worm and a worm gear mechanism inside the first transmission box 220 to rotate the first driving shaft 320 of the first transmission box 220. The first two wheels turn with the rotation of the first driving shaft 320.

FIG. 5 is a section view 500 of the lawn mower 100 showing the first combined pulley 305 and the second combined pulley 310 in communication with the engine pulley 230 and transmission boxes, according to an example embodiment. FIG. 5 shows elements used for installing the first combined pulley 305 and the second combined pulley 310. More specifically, FIG. 5 shows a bolt 515 for securing the second movable pulley and the second fixed pulley on the first pulley shaft 405. Further elements may include a spring washer 520, a flat washer 525, and a spring washer plate 530 used for securing the second spring 420. A pulley retaining pin 535 may be used for retaining the second combined pulley 310. Additionally, a set screw 540 and a key 545 may be used for installing the engine pulley 230. In an example embodiment, a thread or a square shaft can be used instead of the key 545. In further example embodiments, other elements/parts and/or connection methods can be used instead of the key 545. FIG. 5 further shows a spring limited plate 550 and a pulley retaining pin 560 used for instating the first combined pulley 305. It should be understood that the elements for installing the first combined pulley 305 and the second combined pulley 310 presented in FIG. 5 are shown for illustration purposes only. In further example embodiments, the first combined pulley 305 and the second combined pulley 310 can be installed and secured on the lawn mower 100 using other elements/parts and/or connection methods.

The distance between the engine pulley 230 installed on the engine shaft 205 and the first combined pulley 305 of the first transmission box 220 and/or the second combined pulley 310 of the second transmission box 225 may be changed. As shown in FIG. 5, the first combined pulley 305 may be installed in the lawn mower 100 in a position inclined with respect to a vertical axis. FIG. 5 shows a pulley vertical axis 505 inclined with respect to a vertical axis 510. The vertical axis 510 may be perpendicular to a ground surface.

The lawn mower 100 can have two cables separately connected to the first transmission box 220 and the second transmission box 225. An operator of the lawn mower 100 may squeeze one of the two levers (not shown) or two levers of the cables (not shown) at the same time to move one of or both transmission boxes 220 and 225, i.e. to change the angle of inclination of one of or both transmission boxes 220 and 225 with respect to their vertical axis. The control cable(s) can hold one or both transmission boxes 220 and 225 in an inclined position. In other words, when the operator squeezes the lever controlling the front wheels, only the first transmission box 220 (front) is engaged to provide the front wheel drive (FWD) condition. At that time, only the inclination of the first transmission box 220 is adjusted by the first cable for providing a different speed. When the operator squeezes the lever controlling the rear wheels, only the second transmission box 225 (rear) is engaged to provide the rear wheel drive (RWD) condition. At that time, only the inclination of the second transmission box 225 is adjusted by the second cable for providing a different speed. When the operator squeezes both levers, both the first transmission box 220 and the second transmission box 225 are engaged to provide the all-wheel drive (AWD) condition and the inclinations of both the providing are adjusted for providing different speed of both the front wheels and the rear wheels.

As the first transmission box 220 and the first combined pulley 305 are both disposed on the first driving shaft 320, and the second transmission box 225 and the second combined pulley 310 are both disposed on the second drive shaft 325, the inclination of the first transmission box 220 and/or the inclination of the second transmission box 225 via the cable(s) by the operator causes the inclination of the first combined pulley 305 and/or the second combined pulley 310. Changing of the angle of inclination of the first combined pulley 305 and/or the second combined pulley 310 in turn causes changing the distance between first combined pulley 305 and/or the second combined pulley 310 and the engine shaft 205. As a length of the belt 315 is constant, the change of the distance between first combined pulley 305 and/or the second combined pulley 310 and the engine shaft 205 causes the axial movement of the movable pulley with respect to the fixed pulley in each of the first combined pulley 305 and the second combined pulley 310. In each of the combined pulleys, the axial movement of the movable pulley with respect to the fixed pulley changes the diameter of the contacting area between the combined pulley and the belt. Eventually, the rotation speed of the combined pulleys and, hence, the rotation speed of the of the first transmission box and the second transmission box, changes. Thus, the change of the rotation speed of the combined pulleys changes the moving speed of the lawn mower.

Therefore, by changing the distance between the engine pulley 230 installed on the engine shaft 205 and the first combined pulley 305 of the first transmission box 220 or the second combined pulley 310 of the second transmission box 225, or by changing the distance between the engine pulley 230 and both the first combined pulley 305 and the second combined pulley 310, via the action of the belt 315 and the first spring 420 and the second spring 470, the axial distance between the movable pulley and the fixed pulley in the first combined pulley 305 and the second combined pulley 310 may increase or decrease. Thereby, the rotation speed of the combined pulleys and, hence, the rotation speed of the transmission boxes may be changed, which in turn causes a change of the moving speed of the lawn mower.

In an example embodiment, the inclination of the first combined pulley may be selected so as to make clearance changes between the first combined pulley and the cutting deck as small as possible during the movement of the first transmission box. During the movement of the first transmission box for speed adjustment, the position of the first combined pulley can be adjusted to a vertical position at some point.

Figure 6A:
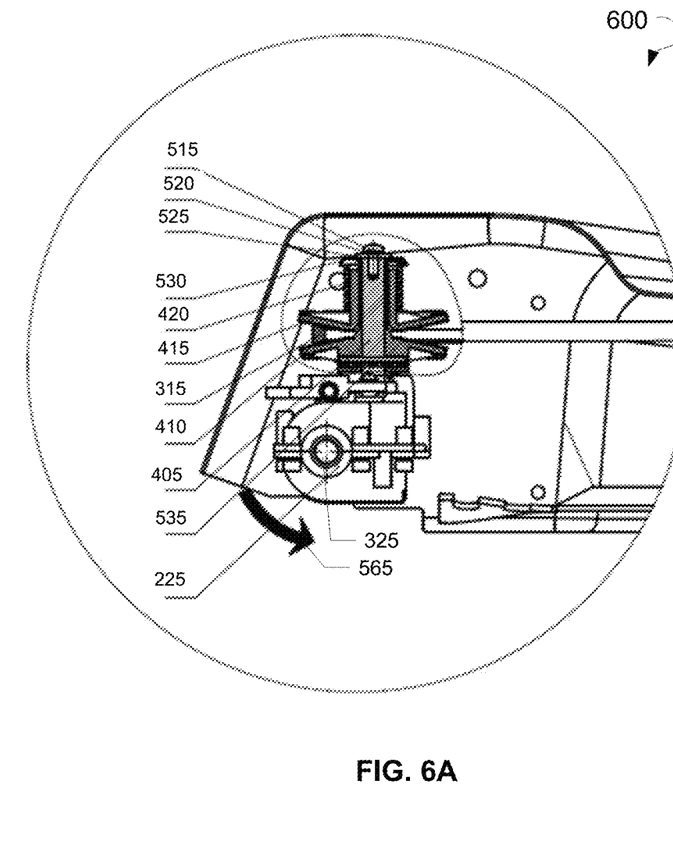
FIG. 6A is an enlarged view showing a combination of a second combined pulley and a second transmission box, according to an example embodiment.
Figure 6B:
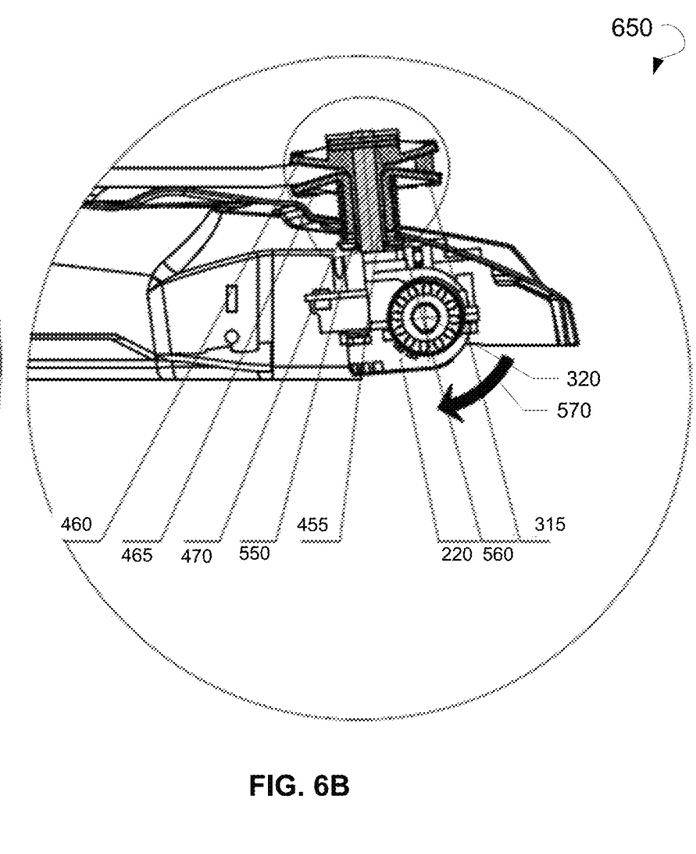
FIG. 6B is an enlarged view showing a combination of a first combined pulley and a first transmission box, according to an example embodiment.

FIG. 6A is an enlarged view 600 showing in detail a combination of the second combined pulley and the second transmission box, which is schematically marked as Section A shown in FIG. 5. FIG. 6B is an enlarged view showing 650 in detail a combination of the first combined pulley and the first transmission box, which is schematically marked as section B shown in FIG. 5.

Each of the combined pulleys has a fixed pulley and a moving pulley. When the distance between the engine pulley on the engine shaft and any of the combined pulleys changes, the belt is forced to move along the direction of the pulley shaft in each of the combined pulleys. The diameter of the contacting area between the belt and each of the combined pulleys is changed while the diameter of the contacting area between the belt and the engine pulley is always fixed. Therefore, the diameter ratio between the engine pulley and each of the combined pulleys is changed, thereby providing adjustment of rotation speed of transmission boxes. This operation principle is described in detail below.

In an example embodiment, the first transmission box is a front transmission box of the lawn mower and the second transmission box is a rear transmission box of the lawn mower. Simultaneous adjustment of the first transmission box and the second transmission box provides a larger range of speed regulation of the lawn mower. More specifically, with reference to FIGS. 5, 6A, and 6B, the speed regulation of the lawn mower is performed as follows. The second transmission box 225 rotates anticlockwise (see arrow 565) around the second driving shaft 325. As the length of the belt 315 is constant, the belt 315 forces the second movable pulley 415 to generate an upward force pressing the second spring 420 upwards and, hence, making the second spring 420 shorter. Upon pressing the second spring 420, the second movable pulley 415 moves upwards along the second pulley shaft 405. The upward movement of the second movable pulley 415 along the second pulley shaft 405 increases a distance between the second movable pulley 415 and the second fixed pulley 410 and gives a space to the belt 315 disposed between the second movable pulley 415 and the second fixed pulley 410. Each of the second movable pulley 415 and the second fixed pulley 410 has a conical surface and are disposed such that a conical surface of the second movable pulley 415 faces a conical surface of the second fixed pulley 410. The belt 315 is disposed between the conical surfaces of the second movable pulley 415 and the second fixed pulley 410. The increase of the distance between the second movable pulley 415 and the second fixed pulley 410 causes the belt 315 to move along the conical surfaces towards the second pulley shaft 405, as well as to move vertically upwards along the direction of the second pulley shaft 405. As a result, the diameter of the contacting area between the second combined pulley 310 and the belt 315 decreases. Otherwise, the decrease of the distance between the second movable pulley 415 and the second fixed pulley 410 causes the belt 315 to move along the conical surfaces outwards toward the second pulley shaft 405, as well as to move vertically downwards along the direction of the second pulley shaft 405. As a result, the diameter of the contacting area between the second combined pulley 310 and the belt 315 increases.

When the belt 315 moves along the conical surfaces outwards toward the second pulley shaft 405, the effective pitch diameter of the belt transmission provided by the belt 315 becomes larger and the transmission ratio provided by the second combined pulley 310 to the second transmission box 225 becomes smaller, which eventually decreases the speed of rotation of the second two wheels. Similarly, when the belt 315 moves along the conical surfaces towards the second pulley shaft 405, the effective pitch diameter of the belt transmission provided by the belt 315 becomes smaller, and the transmission ratio provided by the second combined pulley 310 to the second transmission box 225 becomes larger, which eventually increases the speed of rotation of the second two wheels.

The same movement of the belt 315 causes regulation of the speed provided by the first transmission box 220 to the first two wheels. More specifically, the first transmission box 220 rotates clockwise (see arrow 570 in FIG. 5) around the first driving shaft 320. As the length of the belt 315 is constant, the belt 315 forces the first movable pulley 465 to generate a downward force pressing the first spring 470 downwards and, hence, making the first spring 470 shorter. Upon pressing the first spring 470, the first movable pulley 465 moves downwards on the first pulley shaft 455. The downward movement of the first movable pulley 465 along the first pulley shaft 455 increases a distance between the first movable pulley 465 and the first fixed pulley 460 and gives a space to the belt 315 disposed between the first movable pulley 465 and the first fixed pulley 460. Each of the first movable pulley 465 and the first fixed pulley 460 has a conical surface and is disposed such that a conical surface of the first movable pulley 465 faces a conical surface of the first fixed pulley 460. The belt 315 is disposed between the conical surfaces of the first movable pulley 465 and the first fixed pulley 460. The increase of the distance between the first movable pulley 465 and the first fixed pulley 460 causes the belt 315 to move along the conical surfaces towards the first pulley shaft 455, as well as to move vertically downwards along the direction of the first pulley shaft 455. As a result, the diameter of the contacting area between the first combined pulley 305 and the belt 315 decreases. Otherwise, the decrease of the distance between the first movable pulley 465 and the first fixed pulley 460 causes the belt 315 to move along the conical surfaces outwards toward the first pulley shaft 455, as well as to move vertically upwards along the direction of the first pulley shaft 455. As a result, the diameter of the contacting area between the first combined pulley 305 and the belt 315 increases.

The diameter of contacting area between the engine pulley 230 and the belt 315 is fixed. The engine pulley 230 may have no movable pulley and no spring. Therefore, when the belt 315 moves along the conical surfaces outwards toward the first pulley shaft 455, the effective pitch diameter of the belt transmission provided by the belt 315 becomes larger, and the transmission ratio provided by the first combined pulley 305 to the first transmission box 220 becomes smaller, which eventually decreases the speed of rotation of the first two wheels. Similarly, when the belt 315 moves along the conical surfaces towards the first pulley shaft 455, the effective pitch diameter of the belt transmission provided by the belt 315 becomes smaller, and the transmission ratio provided by the first combined pulley 305 to the first transmission box 220 becomes larger, which eventually increases the speed of rotation of the first two wheels.

Figure 7:
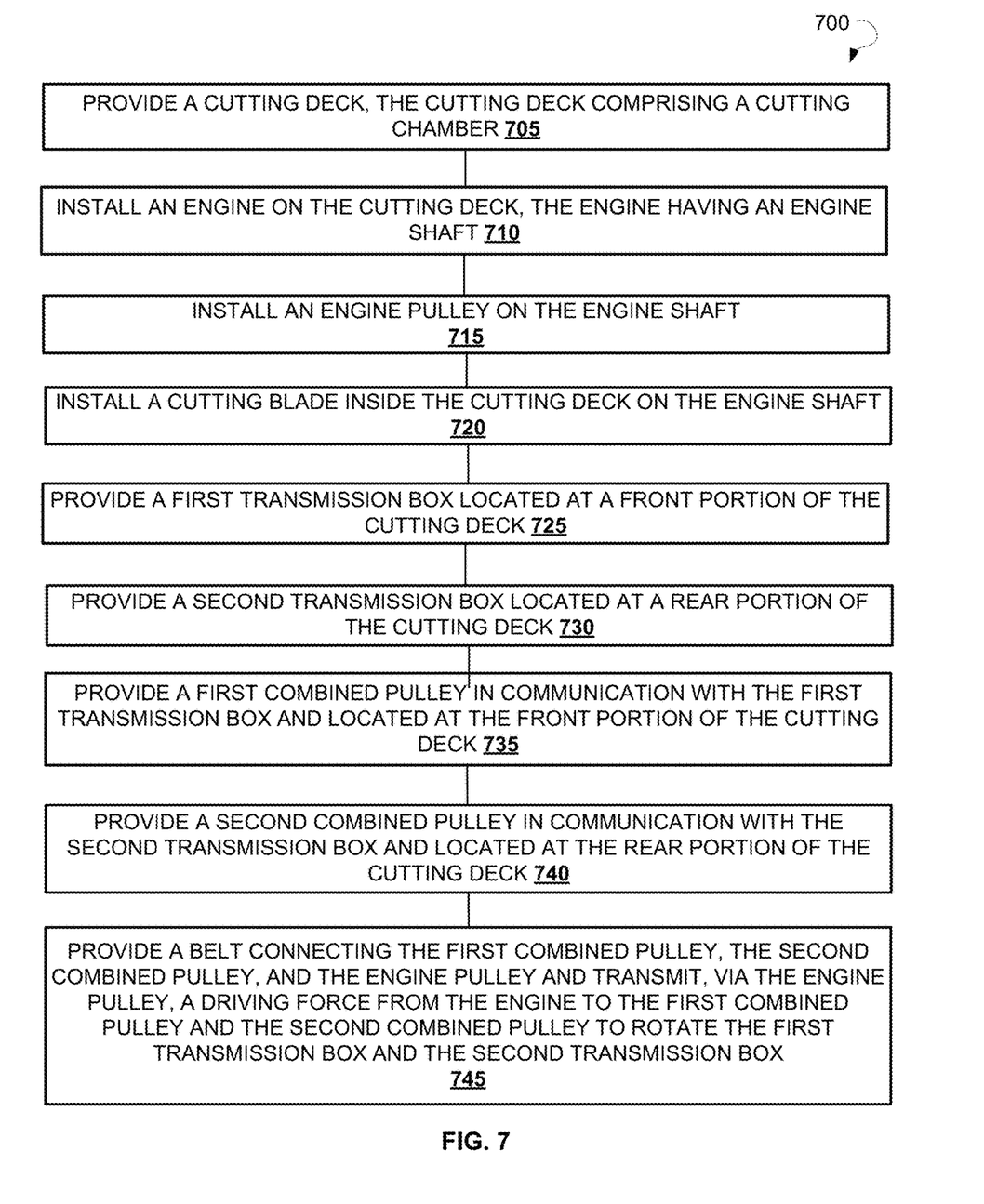
FIG. 7 is a flow chart showing a method for manufacturing a lawn mower, according to an example embodiment.

FIG. 7 is a flow chart showing a method 700 for manufacturing a lawn mower, according to an example embodiment. The method 700 may commence with providing a cutting deck at operation 705. The cutting deck may include a cutting chamber. The method 700 may continue with installing an engine on the cutting deck at operation 710. The engine may have an engine shaft. The method 700 may continue with installing an engine pulley on the engine shaft at operation 715. Upon installing the engine pulley, the method 700 may continue with installing a cutting blade in the cutting chamber of the cutting deck on the engine shaft at operation 720. The cutting deck may have a downward opening so that the cutting blade may be rotatable in the downward opening of the cutting deck. The method 700 may further include providing a first transmission box located at a front portion of the cutting deck at operation 725 and providing a second transmission box located at a rear portion of the cutting deck at operation 730. The method 700 may further include providing a first combined pulley in communication with the first transmission box and located at the front portion of the cutting deck at operation 735 and providing a second combined pulley in communication with the second transmission box and located at the rear portion of the cutting deck at operation 740.

The first combined pulley may include a first pulley shaft in communication with the first transmission box, a first fixed pulley fixedly disposed on the first pulley shaft, and a first movable pulley movable axially along the first pulley shaft. The first combined pulley may further include a first spring disposed on the first pulley shaft and contacting the first movable pulley.

The second combined pulley may include a second pulley shaft in communication with the second transmission box, a second fixed pulley fixedly disposed on the second pulley shaft, and a second movable pulley movable axially along the second pulley shaft. The second combined pulley may further include a second spring disposed on the first pulley shaft and contacting the second movable pulley. The first combined pulley and the second combined pulley may be disposed upside-down with respect to each other or can be disposed symmetrically with respect to each other in the lawn mower.

The method 700 may continue with providing a belt connecting the first combined pulley, the second combined pulley, and the engine pulley at operation 745. The belt may and transmit, via the engine pulley, a driving force from the engine to the first combined pulley and the second combined pulley to rotate the first transmission box and the second transmission box.

The belt may be disposed between the first movable pulley and the first fixed pulley in the first combined pulley. The transmission of the driving force to the first combined pulley may cause the first movable pulley to generate a downward force and press the first spring to cause the movable pulley to move downward and increase a distance between the first movable pulley and the first fixed pulley. The downward movement of the first movable pulley may cause a change of a contact diameter of the belt and the first combined pulley to change the rotation speed provided by the first transmission box.

The belt may be positioned between the second movable pulley and the second fixed pulley in the second combined pulley. Similarly, the transmission of the driving force to the second combined pulley may cause the second movable pulley to generate an upward force and press the second spring to cause the second movable pulley to move upward and increase a distance between the second movable pulley and the second fixed pulley.

The method 700 may further include providing four wheels. Four wheels may include a first two wheels in communication with the first transmission box and a second two wheels in communication with the second transmission box. The rotation of the first transmission box drives the first two wheels and the rotation of the second transmission box drives the second first two wheels.

The method 700 may further include providing two control cables, one cable connected to the first transmission box (the front transmission box) and configured to change an inclination of the first transmission box and the first combined pulley with respect to a vertical axis, the other cable being connected to the second transmission box (the rear transmission box) and configured to change an inclination of the second transmission box and the second combined pulley with respect to a vertical axis. The method 700 may further include providing two control cable levers for operating the control cables by an operator for changing the inclination of the first transmission box and the first combined pulley or changing the inclination of the second transmission box and the second combined pulley. The inclination of the first combined pulley and the second combined pulley may change an effective pitch diameter of a belt transmission provided by the belt to control a rotation speed provided by the first transmission box and the second transmission box. The axial movement of the second movable pulley may cause a change of a contact diameter of the belt and the second combined pulley to change the rotation speed provided by the second transmission box.

The method 700 may further include providing an operation handle connected to the cutting deck and extending from the cutting deck obliquely upwards. The operation handle may be intended for being held by an operator to drive the lawn mower.

Thus, lawn mowers and methods for manufacturing lawn mowers have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A lawn mower comprising:
   a cutting deck, the cutting deck comprising a cutting chamber;
   an engine installed on the cutting deck, the engine having an engine shaft;
   a cutting blade installed in the cutting chamber on the engine shaft;
   an engine pulley installed on the engine shaft;
   a first transmission box located at a front portion of the cutting deck;
   a second transmission box located at a rear portion of the cutting deck;
   a first combined pulley in communication with the first transmission box and located at the front portion of the cutting deck, wherein the first combined pulley comprises:
      a first pulley shaft in communication with the first transmission box;
      a first fixed pulley fixedly disposed on the first pulley shaft;
      a first movable pulley movable axially along the first pulley shaft; and
      a first spring disposed on the first pulley shaft and contacting the first movable pulley;
   a second combined pulley in communication with the second transmission box and located at the rear portion of the cutting deck, wherein the second combined pulley comprises:
      a second pulley shaft in communication with the second transmission box;
      a second fixed pulley fixedly disposed on the second pulley shaft;
      a second movable pulley movable axially along the second pulley shaft; and
      a second spring disposed on the second pulley shaft and contacting the second movable pulley;
   wherein the first combined pulley and the second combined pulley are disposed in one of the following ways: upside-down with respect to each other and symmetrically with respect to each other; and
   a belt connecting the first combined pulley, the second combined pulley, and the engine pulley and configured to transmit, via the engine pulley, a driving force from the engine to the first combined pulley and the second combined pulley to rotate the first transmission box and the second transmission box.

2. The lawn mower of claim 1, further comprising four wheels, the four wheels including:
   a first two wheels in communication with the first transmission box, wherein the rotation of the first transmission box drives the first two wheels; and
   a second two wheels in communication with the second transmission box, wherein the rotation of the second transmission box drives the second two wheels.

3. The lawn mower of claim 1, further comprising an operation handle connected to the cutting deck and extending from the cutting deck obliquely upwards.

4. The lawn mower of claim 1, further comprising two control cables, a first control cable of the two control cables being connected to the first transmission box and configured to change an inclination of the first transmission box and the first combined pulley with respect to a vertical axis, a second control cable of the two control cables being connected to the second transmission box and configured to change an inclination of the second transmission box and the second combined pulley with respect to a vertical axis.

5. The lawn mower of claim 4, further comprising two control cable levers for operating the two control cables by an operator for changing the inclination of the first transmission box and the first combined pulley and changing the inclination of the second transmission box and the second combined pulley, wherein the inclination of the first combined pulley and the second combined pulley changes effective pitch diameters of a belt transmission provided by the belt to control a rotation speed provided by the first transmission box and the second transmission box.

6. The lawn mower of claim 1, wherein the transmitting the driving force to the first combined pulley causes the first movable pulley to generate a downward force and press the first spring to cause the movable pulley to move downward and increase a distance between the first movable pulley and the first fixed pulley, the belt being disposed between the first movable pulley and the first fixed pulley.

7. The lawn mower of claim 6, wherein the downward movement of the first movable pulley causes a change of a contact diameter of the belt and the first combined pulley to change the rotation speed provided by the first transmission box.

8. The lawn mower of claim 7, wherein the transmitting the driving force to the second combined pulley causes the second movable pulley to generate an upward force and press the second spring to cause the second movable pulley to move upward and increase a distance between the second movable pulley and the second fixed pulley, the belt being disposed between the second movable pulley and the second fixed pulley.

9. The lawn mower of claim 8, wherein the upward movement of the second movable pulley causes a change of a contact diameter of the belt and the second combined pulley to change the rotation speed provided by the second transmission box.

10. The lawn mower of claim 1, wherein the cutting deck has a downward opening, wherein the cutting blade is rotatable in the downward opening.

11. A method for manufacturing a lawn mower, the method comprising:

providing a cutting deck, the cutting deck comprising a cutting chamber;
installing an engine on the cutting deck, the engine having an engine shaft;
installing an engine pulley on the engine shaft;
installing a cutting blade in the cutting chamber on the engine shaft;
providing a first transmission box located at a front portion of the cutting deck;
providing a second transmission box located at a rear portion of the cutting deck;
providing a first combined pulley in communication with the first transmission box and located at the front portion of the cutting deck, wherein the first combined pulley comprises:
 a first pulley shaft in communication with the first transmission box;
 a first fixed pulley fixedly disposed on the first pulley shaft;
 a first movable pulley movable axially along the first pulley shaft; and
 a first spring disposed on the first pulley shaft and contacting the first movable pulley;
providing a second combined pulley in communication with the second transmission box and located at the rear portion of the cutting deck, wherein the second combined pulley comprises:
 a second pulley shaft in communication with the second transmission box;
 a second fixed pulley fixedly disposed on the second pulley shaft;
 a second movable pulley movable axially along the second pulley shaft; and
 a second spring disposed on the first pulley shaft and contacting the second movable pulley;
wherein the first combined pulley and the second combined pulley are disposed in one of the following ways: upside-down with respect to each other and symmetrically with respect to each other; and
providing a belt connecting the first combined pulley, the second combined pulley, and the engine pulley and transmitting, via the engine pulley, a driving force from the engine to the first combined pulley and the second combined pulley to rotate the first transmission box and the second transmission box.

12. The method of claim 11, further comprising providing four wheels, the four wheels comprising:
a first two wheels in communication with the first transmission box, wherein the rotation of the first transmission box drives the first two wheels; and
a second two wheels in communication with the second transmission box, wherein the rotation of the second transmission box drives the second two wheels.

13. The method of claim 11, further comprising providing two control cable, a first control cable of the two control cables being connected to the first transmission box and configured to change an inclination of the first transmission box and the first combined pulley with respect to a vertical axis, a second control cable of the two control cables being connected to the second transmission box and configured to change an inclination of the second transmission box and second combined pulley with respect to a vertical axis.

14. The method of claim 13, further comprising providing two control cable levers for operating the two control cables by an operator for changing the inclination of the first transmission box and the first combined pulley and changing the inclination of the second transmission box and the second combined pulley, wherein the inclination of the first combined pulley and the second combined pulley change effective pitch diameters of a belt transmission provided by the belt to control a rotation speed provided by the first transmission box and the second transmission box.

15. The method of claim 11, wherein the transmitting the driving force to the first combined pulley causes the first movable pulley to generate a downward force and press the first spring to cause the movable pulley to move downward and increase a distance between the first movable pulley and the first fixed pulley, the belt being disposed between the first movable pulley and the first fixed pulley.

16. The method of claim 15, wherein the downward movement of the first movable pulley causes a change of a contact diameter of the belt and the first combined pulley to change the rotation speed provided by the first transmission box.

17. The method of claim 16, wherein the transmitting the driving force to the second combined pulley causes the second movable pulley to generate an upward force and press the second spring to cause the second movable pulley to move upward and increase a distance between the second movable pulley and the second fixed pulley, the belt being disposed between the second movable pulley and the second fixed pulley,
 wherein the upward movement of the second movable pulley causes a change of a contact diameter of the belt and the second combined pulley to change the rotation speed provided by the second transmission box.

18. A lawn mower comprising:
a cutting deck, the cutting deck comprising a cutting chamber;
an engine installed on the cutting deck, the engine having an engine shaft;
an engine pulley installed on the engine shaft;
a cutting blade installed in the cutting chamber on the engine shaft;
a first transmission box located at a front portion of the cutting deck;
a second transmission box located at a rear portion of the cutting deck;
a first combined pulley in communication with the first transmission box and located at the front portion of the cutting deck;
wherein the first combined pulley comprises:
 a first pulley shaft in communication with the first transmission box;
 a first fixed pulley fixedly disposed on the first pulley shaft;
 a first movable pulley movable axially along the first pulley shaft; and
 a first spring disposed on the first pulley shaft and contacting the first movable pulley;
a second combined pulley in communication with the second transmission box and located at the rear portion of the cutting deck;
wherein the second combined pulley comprises:
 a second pulley shaft in communication with the second transmission box;
 a second fixed pulley fixedly disposed on the second pulley shaft;
 a second movable pulley movable axially along the second pulley shaft; and
 a second spring disposed on the first pulley shaft and contacting the second movable pulley;

wherein the first combined pulley and the second combined pulley are disposed upside-down with respect to each other;

a belt connecting the first combined pulley, the second combined pulley, and the engine pulley and transmitting, via the engine pulley, a driving force from the engine to the first combined pulley and the second combined pulley to rotate the first transmission box and the second transmission box;

two control cables, a first control cable of the two control cables being connected to the first transmission box and configured to change an inclination of the first transmission box and the first combined pulley with respect to a vertical axis, a second control cable of the two control cables being connected to the second transmission box and configured to change an inclination of the second transmission box and the second combined pulley with respect to a vertical axis; and two control cable levers for operating the two control cables by an operator for changing the inclination of the first transmission box and the first combined pulley and changing the inclination of the second transmission box and the second combined pulley, wherein the inclination of the first combined pulley and the second combined pulley changes effective pitch diameters of a belt transmission provided by the belt to control a rotation speed provided by the first transmission box and the second transmission box.

* * * * *